United States Patent
Brady et al.

(10) Patent No.: US 10,041,844 B1
(45) Date of Patent: Aug. 7, 2018

(54) FLUID FLOW RATE ASSESSMENT BY A NON-INTRUSIVE SENSOR IN A FLUID TRANSFER PUMP SYSTEM

(71) Applicant: INTERNATIONAL BUSINESS MACHINES CORPORATION, Armonk, NY (US)

(72) Inventors: Niall Brady, Kildare (IE); Liam Harpur, Dublin (IE); Paulito P. Palmes, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/482,597

(22) Filed: Apr. 7, 2017

(51) Int. Cl.
*G08B 21/00* (2006.01)
*G01K 17/06* (2006.01)
*G01K 17/08* (2006.01)
*G01F 1/684* (2006.01)

(52) U.S. Cl.
CPC .............. *G01K 17/06* (2013.01); *G01F 1/684* (2013.01); *G01F 1/6842* (2013.01); *G01F 1/6847* (2013.01); *G01K 17/08* (2013.01)

(58) Field of Classification Search
CPC combination set(s) only.
See application file for complete search history.

(56) References Cited

U.S. PATENT DOCUMENTS

| | | | |
|---|---|---|---|
| H001132 H * | 1/1993 | Hellyar | 340/603 |
| 6,779,919 B1 | 8/2004 | Staniforth et al. | |
| 6,834,993 B1 | 12/2004 | Staniforth | |
| 2007/0110121 A1 | 5/2007 | Hsu | |
| 2007/0257806 A1* | 11/2007 | Madden | G01N 33/18 340/603 |
| 2011/0303019 A1* | 12/2011 | Gysling | G01F 1/704 73/861.07 |
| 2016/0041015 A1 | 2/2016 | Sheverev et al. | |
| 2016/0047694 A1 | 2/2016 | Proctor et al. | |
| 2016/0163177 A1 | 6/2016 | Klicpera | |
| 2017/0038233 A1 | 2/2017 | Joshi et al. | |
| 2017/0168034 A1 | 6/2017 | Fenton | |

FOREIGN PATENT DOCUMENTS

| | | |
|---|---|---|
| EP | 2261546 A1 | 12/2010 |
| WO | 2015134715 A2 | 9/2015 |
| WO | 2015178904 A1 | 11/2015 |
| WO | 2016032457 A1 | 3/2016 |

OTHER PUBLICATIONS

Parry et al., "Operationalising IoT for reverse supply: the development of use-visibility measures," Supply Chain anagement: An International Journal, ISSN 1359-8546 [In Press], 2016 (32 pages).
"Strap-on Temperature Sensor," Electronik, http://downloads.epluse.com/fileadmin/data/product/ee441/datasheet_EE441.pdf, v. 1.4 (3 pages) accessed Jun. 22, 2018.

* cited by examiner

*Primary Examiner* — Travis Hunnings
(74) *Attorney, Agent, or Firm* — Griffiths & Seaton PLLC

(57) ABSTRACT

Embodiments for assessing energy in a fluid transfer pump system in a cloud computing environment by a processor. A fluid flow rate may be cognitively determined according to a tracer stimulus, injected into the fluid transfer pump system, and adequately detected by one or more Internet of Things (IoT) sensors located at one or more selected positions of a piping network in the fluid transfer pump system.

21 Claims, 9 Drawing Sheets

US 10,041,844 B1

FLUID FLOW RATE ASSESSMENT BY A NON-INTRUSIVE SENSOR IN A FLUID TRANSFER PUMP SYSTEM

BACKGROUND OF THE INVENTION

Field of the Invention

The present invention relates in general to computing systems, and more particularly to, various embodiments for cognitively assessing fluid flow rate in a fluid transfer pump system in a cloud computing environment using a computing processor.

Description of the Related Art

In today's society, various advances in mechanical systems, coupled with advances in computing technology have made possible a wide variety of attendant benefits, such as increasing the efficiency of fluid transfer pump systems. As computers proliferate throughout aspects of society, additional opportunities continue to present themselves for leveraging technology in fluid transfer pump systems for improving efficiency of power and energy consumption while minimizing energy footprints.

SUMMARY OF THE INVENTION

Various embodiments for cognitively assessing fluid flow rate in a fluid transfer pump system in a cloud computing environment by a processor are provided. In one embodiment, by way of example only, a method/system for assessing fluid flow rate or thermal energy in a fluid transfer pump system using an array of Internet of Things (IoT) sensors in a cloud computing environment is provided. A fluid flow rate may be cognitively determined according to a tracer stimulus, injected into the fluid transfer pump system, by one or more IoT sensors (e.g., non-intrusive IoT sensors) located at one or more selected positions of a piping network in the fluid transfer pump system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
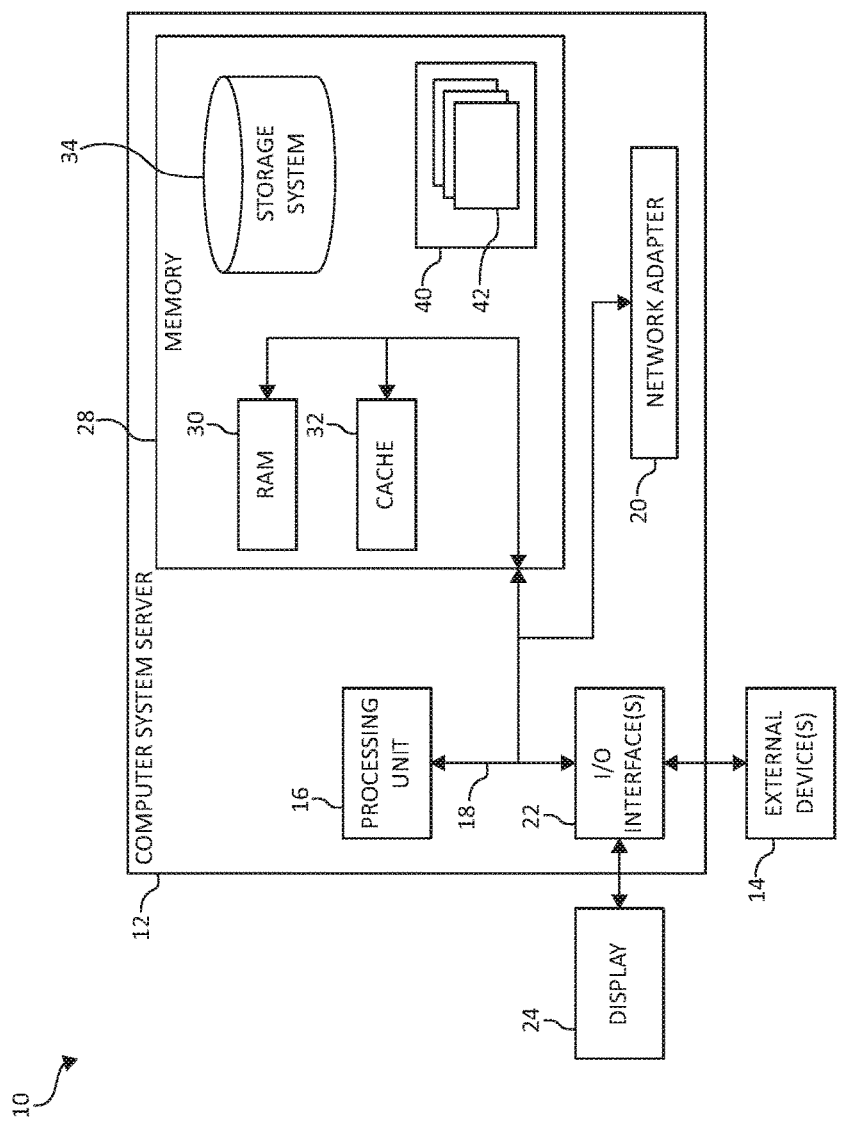
FIG. 1 is a block diagram depicting an exemplary computing node according to an embodiment of the present invention.

A fluid measurement system pertains to the movement of fluid. Flow measurement may be the quantification of fluid movement and may be measured by measuring the velocity of fluid over a known area. As will be described herein, various embodiments provided herein pertain to the flow rate and fluid measurement associated with fluid transfer pump systems such as, for example, thermal energy pumped liquid delivery systems, systems that may include high pressure hot water ("HPHW" or steam) systems, low pressure hot water (LPHW) systems, process cooling water, chilled water, refrigeration (high pressure side) systems, or other fluid pump systems.

Currently, directly measuring flow rates within a fluid measurement system requires expensive and complex systems. For example, energy pumped liquid delivery systems require the introduction of inline flow sensors (e.g., intrusive sensors) or inline energy meters (e.g., intrusive energy meters) at the system's core. Installation of such flow meters can be expensive and highly disruptive as the system may need to be drained down, and pipes cut in order to install a new flow meter. As such, a need exists for real-time flow measurement to enable increased energy savings and efficiency in a pumping system without actually intruding into the system. For example, a need exists for real-time flow measurements in buildings and in systems that are inexpensive, reduce/eliminate any disruption to a system, and address undetected and detected energy wastage opportunities. In this way, the present invention reduces the expense and disruption of in line sensor deployment in estimating flow rates in any closed pumped thermal energy delivery systems (heating and cooling), by injecting a known tracer signal into a flow pipe, at a known location and known timestamp, and applying a statistical detection operation based on a measured physical variable captured by an Internet of Things ("IoT") sensor coupled to or strapped to an outer surface of a pipe to accurately detect the injected signal in time. The detected, injected signal may be used to cognitively estimate a flow rate in the pipe.

In one aspect, the present invention pertains to any closed-loop thermal energy system (heating and cooling). The benefits and advantages of the system may include eliminating/reducing the requirement to shut down a system. The present invention enables the system to maintain operation, without a system shutdown, by injecting an injection signal that may be detected by an IoT sensor secured on an electrical heat source. The injection signal may be one or more various types of detectable signals at a downstream (e.g., downstream in a piping network where the pump in the piping network is a starting point), non-invasive IoT sensor-based device. Also, the injection signal may take the form of starting a circulation pump after a prolonged system shutdown, a local release of a high temperature heat reservoir source creating a distinctive and detectable temperature step change, and/or the use of a unique variable-speed drive ("VSD") variation pattern control pattern applied to the circulation pump, in order to create a detectable signal at the downstream IoT sensor-based device.

Thus, various embodiments for cognitively assessing fluid flow rate in a fluid transfer pump system by an array of IoT sensor-based devices in a cloud computing environment by a processor, are provided. In one embodiment, by way of example only, the present invention provides for assessing fluid flow rate or thermal energy in a fluid transfer pump system using an array of Internet of Things (IoT) sensors in a cloud computing environment. A fluid flow rate may be cognitively determined according to a tracer stimulus, injected into the fluid transfer pump system, by one or more IoT sensors located at one or more selected positions of a piping network in the fluid transfer pump system.

In one aspect, the present invention provides for automatically detecting a fluid flow rate energy usage anomaly in a heat exchanger unit such as, for example, detecting an energy usage anomaly in a peer-to-peer refrigeration system.

In one aspect, the present invention provides for one or more non-intrusive IoT sensors deployable in a fluid pump transfer system (including heating and cooling systems) without installation resource support that may operate within a cloud computing environment. The one or more non-intrusive IoT sensors may be selectively and/or strategically positioned on one or more pipes (e.g., connect/strap on to outside of a pipe in a network of piping) in any closed pumped thermal energy pump fluid transfer system (which may include high pressure hot water ("HPHW" or steam) systems, low pressure hot water ("LPHW") systems, process cooling water, chilled water, refrigeration (high pressure side) systems, or other fluid pump systems). Data may be continuously sampled and may be used to adequately characterize a state (e.g., health state) of a system.

Figure 7:
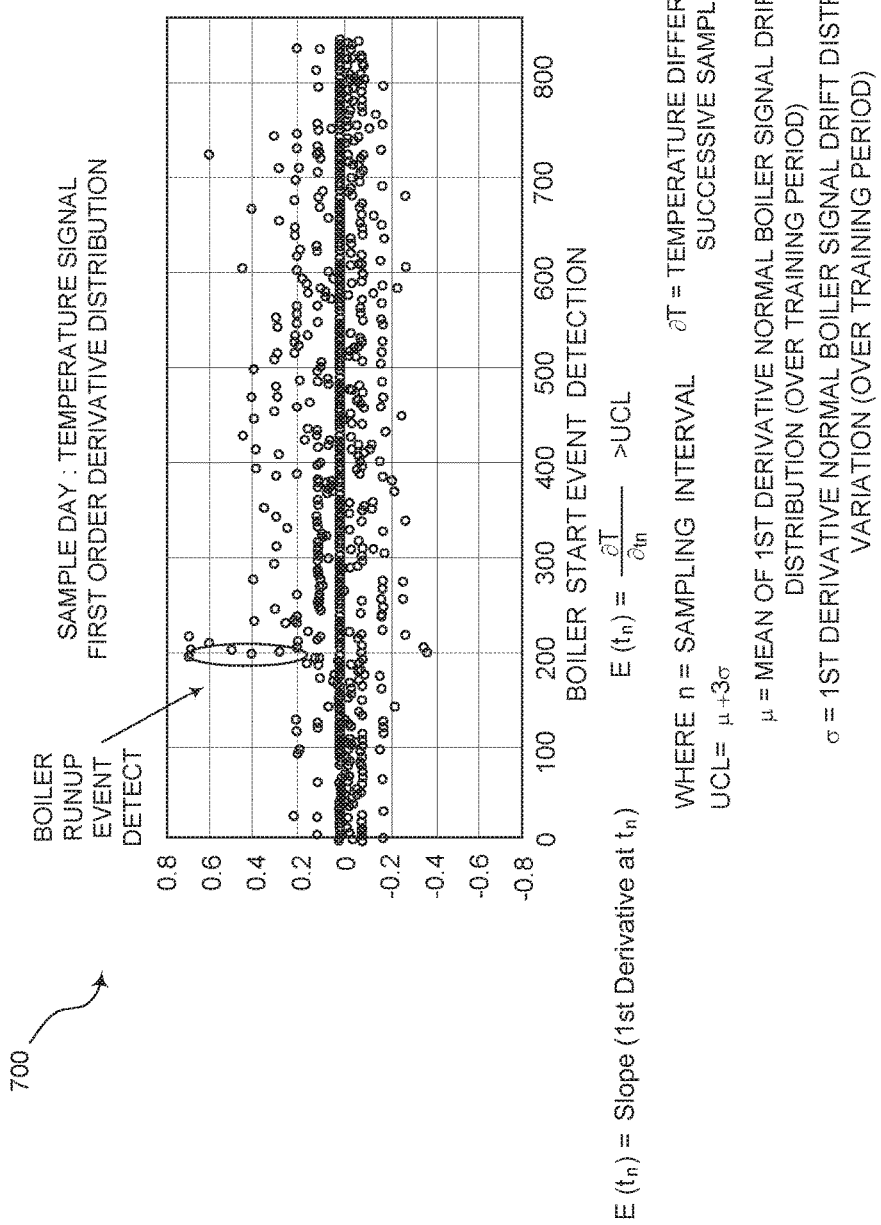
FIG. 7 is a graph diagram of output results of an energy detection operation upon injecting a tracer stimuli in a fluid transfer pump system in accordance with aspects of the present invention.

In one aspect, the present invention may cognitively determine fluid flow rates by injecting a known tracer signal into a flow pipe, at a known location and known timestamp, and perform one or more cloud-based, real-time statistical detection operations (using statistical analysis of first order temperature derivative distributions, see FIG. 7.) based on a measured physical variable captured by one or more IoT sensors coupled to a pipe downstream of a pump head. One or more IoT sensors may detect the injected signal in time, which may then be used to cognitively determine an estimate of flow rate in a selected pipe.

In one aspect, the present invention may deploy a single IoT sensor on a return section (post energy load section) of the piping network, and perform one or more cloud-based, real-time statistical detection operations on a single data point ($T_{return}$) and cognitively assess/determine a health state of the system. Also, data sampling may occur during a selected period of time (e.g., 24 hours of data sampling and training) and provide for the detection of anomalous system control and demand events (e.g. detecting short cycling events in boilers) of the measured system with no domain expertise involvement. The present invention also negates the need for ancillary data or hardware inputs requirements.

In one aspect, the present invention may cognitively estimate flow rate. The present invention may establish an energy output of the measured system as an alternative to available standalone energy meter capabilities, by using the cognitively estimated flow rate when combined with additionally positioned IoT temperature sensor devices to establish the delta T (difference between $T_{return}$ and $T_{flow}$) so as to provide a non-intrusive energy meter capability, provide a cost effective way of providing energy metering capabilities, and avoid the deployment of costly and disruptive inline energy meters.

A closed-loop thermal energy system (e.g., a comparative boiler or chiller) performance assessment may be performed under one or more defined or standardized situations where buildings operate a system duty/standby arrangement, where one boiler or one chiller takes a lead position rotated over a selected period of time (e.g., weekly or monthly or the lead position between plant) or regularly alternated at selected time intervals. One or more analytics may be provided for over a selected period of time for a direct peer-to-peer comparison of the closed-loop thermal energy system's performance (e.g., boiler/chiller performance) that may be used to identify any system performance and control anomalies detected within individual and similar systems.

In one aspect, the present invention may use the single data point ($T_{return}$) sampled over a selected time period (e.g., one week period) from one or more heating and cooling services (which may be employed in a building). The one or more IoT sensors may be in a network of the IoT return sensors deployed across a complete campus cluster of pumped thermal energy pump fluid transfer systems (e.g., a cluster of IoT sensors of the IoT network). In this way, the present invention provides for the generation and determination of a comprehensive measurement of the estate of the cluster of IoT sensors and/or provides Facilities Management and Operational personnel an automated method of validating boiler schedules across large campus estates and that may be used to identify any anomalies against company agreed runtime policies.

Deploying multiple IoT sensors strategically positioned throughout the IoT network provides a cost effective means of detecting system blockages and flow rate problems while enabling the identification of energy starvation scenarios at one or more locations of the IoT network. Also, the present invention provides for the detection of various shifts in pump speed operations using the IoT sensors, assessment of degradation of pump operations using the IoT sensors, and/or cognitive prediction of an imminent pump failure. The present invention may also cognitively determine emerging system blockages in the IoT network.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, tablets).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
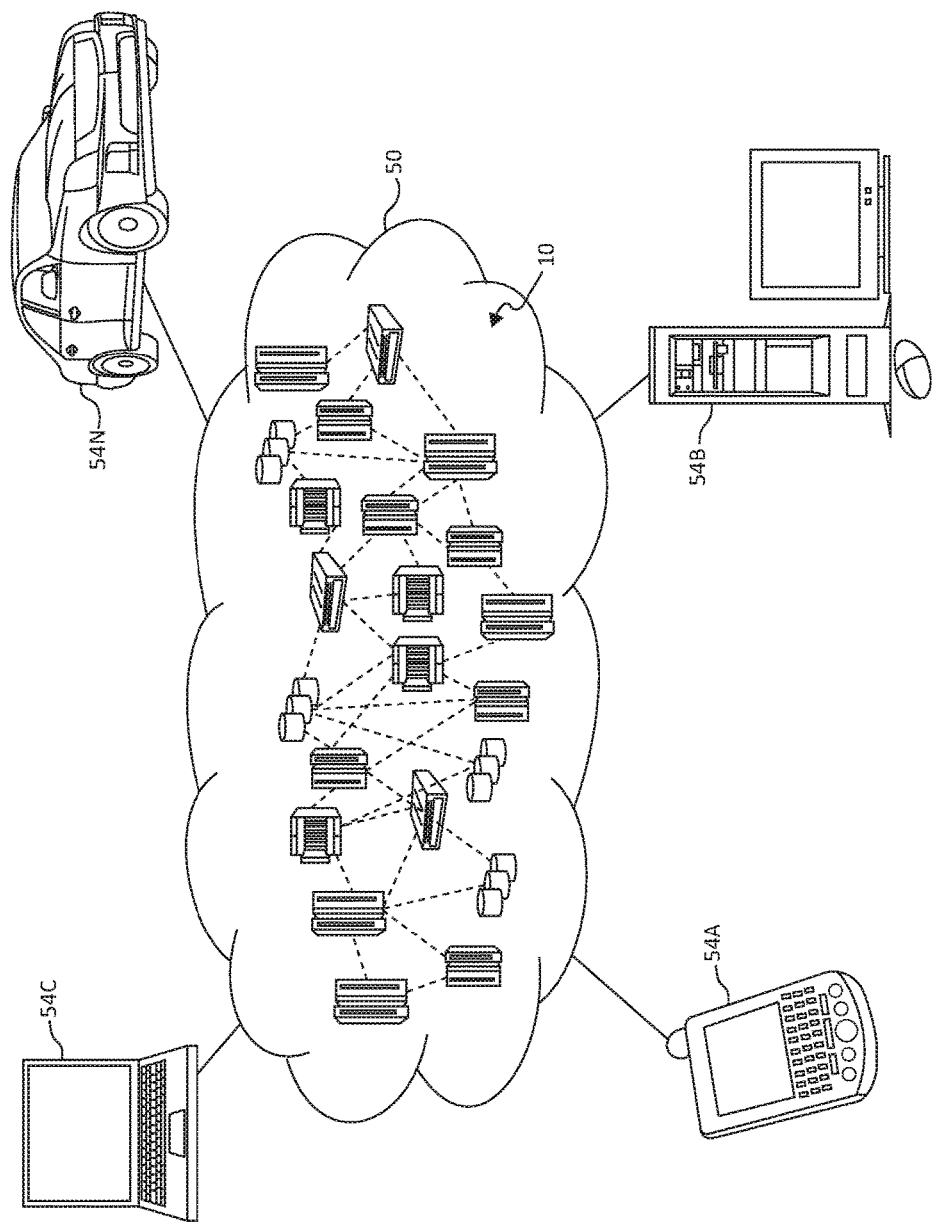
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
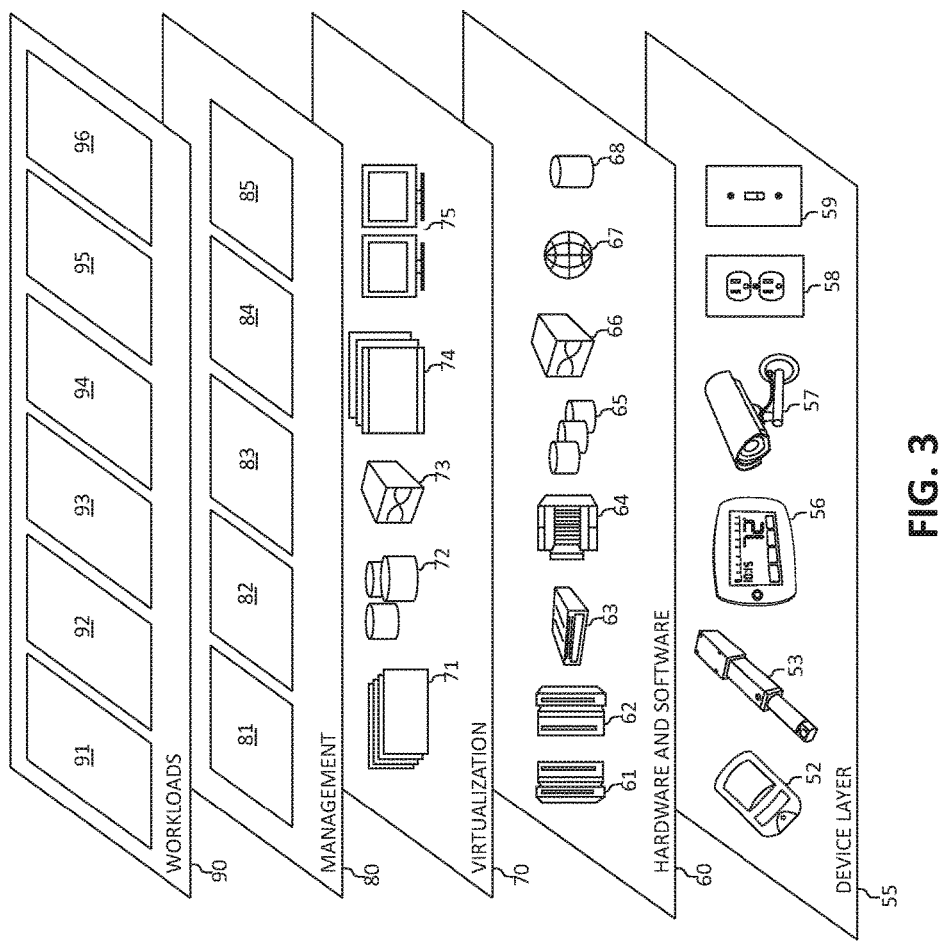
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for cognitively assessing energy in a fluid transfer pump system using an array of IoT sensors. In addition, workloads and functions 96 for cognitively assessing energy in a fluid transfer pump system using an array of IoT sensors may include such operations as data analysis (including data collection and processing from various environmental sensors), and predictive data analytics functions. One of ordinary skill in the art will appreciate that the workloads and functions 96 for cognitively assessing energy in a fluid transfer pump system using an array of IoT sensors may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As described herein, the present invention provides for cognitively assessing energy in a fluid transfer pump system using an array of IoT sensors in a cloud computing environment. In one aspect, an IoT enabled temperature sensor may be coupled (e.g., strapped) to a section of pipe of the fluid transfer pump system at a selected/known measured distance from a defined starting point, such as, for example, 100 meters distance from the defined starting point, which may be an outlet manifold of a circulating pump, or a valve injection point of a heat reservoir. One or more IoT sensors may be set to log at high frequency with sampling rates of the order of every 1-2 seconds so as to detect and clock the arrival of an expected temperature injection signal tracer. The start time period may be marked/timestamped by a re-starting of circulation pump after a prolonged shutdown (e.g., greater than a shutdown time threshold) to generate a clear (or detectable) temperature step change signal that may propagate down a pipe of the fluid transfer pump system. A supervised learning operation may be performed on the arrival of the resultant injection signal temperature that impacts with an optimized injection pattern such that the inject signal can be reliably detected at the IoT sensor (as described in FIG. 7). A statistically determined detected stop time may be established from the detection signal algorithm Steady state flow rates may be subsequently estimated from the gathered timestamp stop/start markers over the designated measured distance. A comparable accuracy of the proposed method of flow rate detection, as described herein, may be validated against a system with an existing flow meter in place where comparative flow rate values may be established at the various speeds with the operational range of the fluid transfer pump system.

Figure 4:
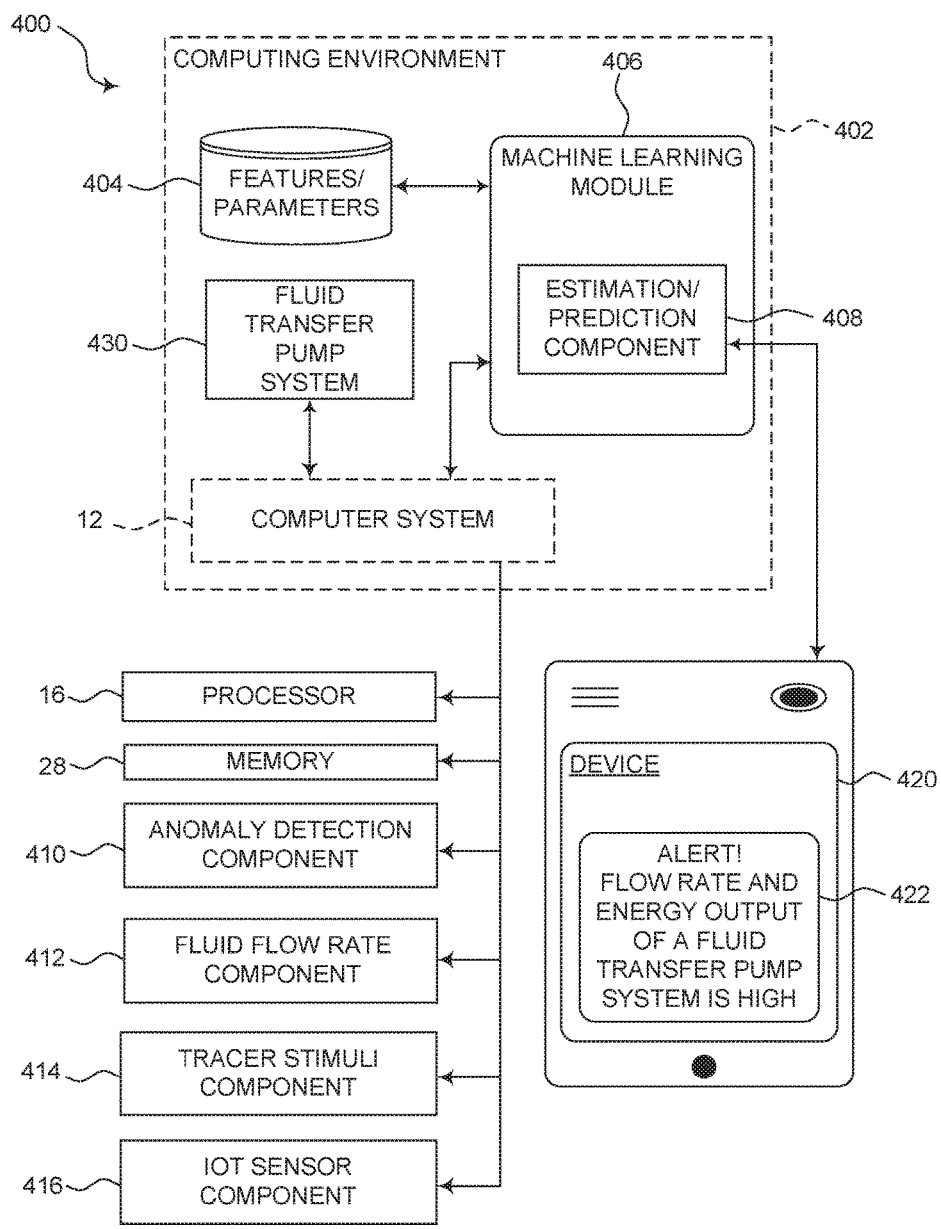
FIG. 4 is a diagram depicting various user hardware and computing components functioning in accordance with aspects of the present invention.

Turning now to FIG. 4, a block diagram depicting exemplary functional components 400 according to various mechanisms of the illustrated embodiments, is shown. FIG. 4 illustrates energy usage anomaly detection and fault diagnosis and training of a machine-learning model in a computing environment, such as a computing environment 402, according to an example of the present technology. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for accurate temporal event predictive modeling in accordance with the present invention. Many of the functional blocks 400 may execute as background processes on various components, either in distributed computing components, or on the user device, or elsewhere. Computer system/server 12 is again shown, incorporating processing unit 16 and memory 28 to perform various computational, data processing and other functionality in accordance with various aspects of the present invention.

The system 400 may include the computing environment 402 (e.g., included in a heat exchange system/unit), a fluid transfer pump system 430, and a device 420, such as a desktop computer, laptop computer, tablet, smart phone, and/or another electronic device that may have one or more processors and memory. The device 420, the fluid transfer pump system 430, and the computing environment 402 may each be associated with and/or in communication with each other, by one or more communication methods, such as a computing network. In one example, the device 420 and/or the fluid transfer pump system 430 may be controlled by an owner, customer, or technician/administrator associated with the computing environment 402. In another example, the device 420 and/or the fluid transfer pump system 430 may be completely independent from the owner, customer, or technician/administrator of the computing environment 402.

In one aspect, the computing environment 402 may provide virtualized computing services (i.e., virtualized computing, virtualized storage, virtualized networking, etc.) to devices 420. More specifically, the computing environment 402 may provide virtualized computing, virtualized storage, virtualized networking and other virtualized services that are executing on a hardware substrate.

As depicted in FIG. 4, the computing environment 402 may include a machine learning module 406, a features and/or parameters 404 that is associated with a machine learning module 406 and the fluid transfer pump system 430. The features and/or parameters database 404 may also include energy usage profiles for each fluid transfer pump system 430 and/or IoT sensor devices associated with a IoT sensor component 416. It should be noted that one or more IoT sensor devices may be represented as the IoT sensor component 416 may be coupled to the fluid transfer pump system 430. The features and/or parameters 404 may be a combination of features, parameters, behavior characteristics, energy usage profile data, temperature data, historical data, tested and validated data, or other specified/defined data for testing, monitoring, validating, detecting, learning, analyzing and/or calculating various conditions or diagnostics relating to cognitively assessing thermal energy in the fluid transfer pump system 430. That is, different combinations of parameters may be selected and applied to the input data for learning or training one or more machine learning models of the machine learning module 406. The features and/or parameters 404 may define one or more settings of one or more non-intrusive one or more IoT sensors associated with the IoT sensor component 416 to enable the one or more non-intrusive IoT sensors to detect a temperature injection tracer stimuli via the IoT sensor component 416. The one or more non-intrusive one or more IoT sensors associated with the IoT sensor component 416 may be coupled to the fluid transfer pump system 430 at one or more defined distances from an alternative non-intrusive sensor.

The computing environment 402 may also include a computer system 12, as depicted in FIG. 1. The computer system 12 may also include the anomaly detection component 410, a fluid flow rate component 412, a tracer stimuli component 414, and an IoT sensor component 416 each associated with the machine learning module for training and learning one or more machine learning models and also for applying multiple combinations of features, parameters, behavior characteristics, energy usage profiles, fluid flow rate data, temperature data, or a combination thereof to the machine learning model for cognitively assessing thermal energy in a fluid transfer pump system.

In one aspect, the machine learning module 406 may include an estimation/prediction component 408 for cognitively predicting and/or estimating a fluid flow rate according to a tracer stimulus, injected into the fluid transfer pump system, by one or more IoT sensors associated with the IoT sensor component 416 located at one or more selected positions of a piping network in the fluid transfer pump system 430. For example, the computer system 12, using the anomaly detection component 410 and the fluid flow rate component 412, may cognitively determine the fluid flow rate according to a tracer stimulus, injected into the fluid transfer pump system, by one or more IoT sensors associated with the IoT sensor component 416. An energy usage profile of the fluid transfer pump system 430 may be created, defined, stored, and maintained in the machine learning module 406, the features and/or parameters 404, or both.

The machine learning module 406 may collect feedback information from the one or more IoT sensors associated with the IoT sensor component 416 to establish a health state of the fluid transfer pump system 430 and detect (in association with the anomaly detection component 410) one or more anomalous fluid transfer pump system events. The machine learning module 406 may use the feedback information to provide a cognitive estimate of an energy output of the fluid transfer pump system 430 using the estimation/ prediction component 408. That is, the estimation/prediction component 408 may cognitively estimate the fluid flow rate according to a tracer stimulus, injected into the fluid transfer pump system, by one or more IoT sensors associated with the IoT sensor component 416. More specifically, the estimation/prediction component 408 may cognitively estimate the fluid flow rate according to the detected tracer stimulus based on a first timestamp and a second timestamp. The machine learning module 406 may be initialized using feedback information to learn behavior of a fluid transfer pump system 430.

The tracer stimuli component 414 may detect the temperature injection tracer stimuli by one or more non-intrusive IoT sensor-based devices associated with the IoT sensor component 416. A first non-intrusive sensor associated with the IoT sensor component 416 may measure a start time of the temperature injection tracer stimuli and the one or more alternative non-intrusive IoT sensors associated with the IoT sensor component 416 may detect an arrival time of the temperature injection tracer stimuli.

The anomaly detection component 410 may cognitively detect an energy usage anomaly according to a determined flow rate.

The device 420 may include a graphical user interface (GUI) 422 enabled to display on the device 420 one or more user interface controls for a user to interact with the GUI 422. For example, the GUI 422 may display an energy output or fluid flow rate to a user via an interactive graphical user interface (GUI) according to the cognitive estimate of an energy output of the fluid transfer pump system. For example, the energy output or fluid flow rate event may be an alert that indicates or displays audibly and/or visually on the GUI 422 "ALERT! Flow rate and energy output of a fluid transfer pump system is high."

In one aspect, the cognitive thermal energy assessment in a fluid transfer pump system and estimation/predictive modeling (or machine learning modeling), as described herein, may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

In one aspect, the computing system 12/computing environment 402 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Figure 5:
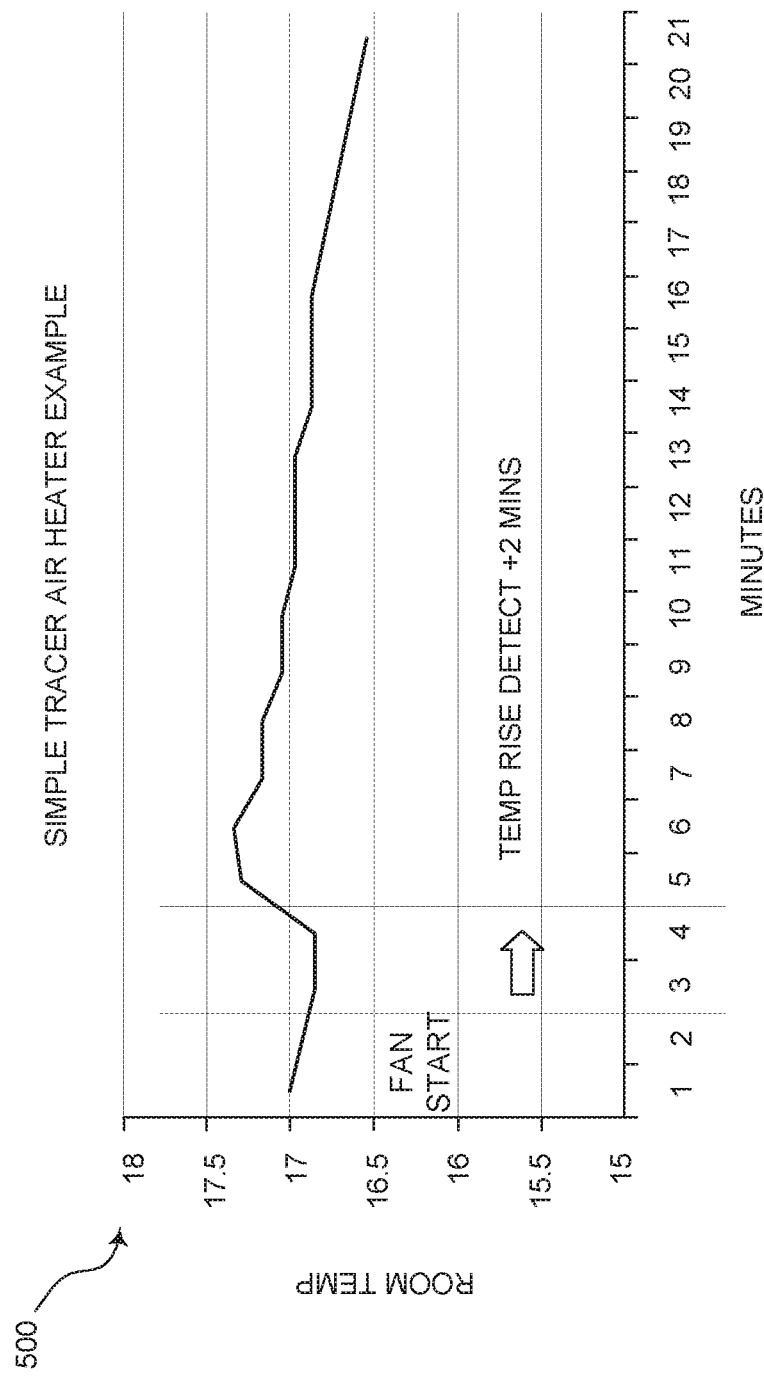
FIG. 5 is a graph diagram of an exemplary method for cognitively assessing energy in a fluid transfer pump system by a processor, in which various aspects of the present invention may be realized.

FIG. 5 is a graph diagram 500 of an exemplary method for cognitively assessing energy in a fluid transfer pump system by a processor. Graph diagram 500 depicts an example of assessing energy in a fluid transfer pump system in a cloud computing environment by a processor by using an analogy of turning on a heater (tracer signal injection analogy) in a room. Graph diagram 500 depicts the room temperature on the Y-axis and the time period (e.g., minutes) on the X-axis. A fan of the heater may be started at a first time period 2.5 minutes and the rise in the temperature is detected at a second time period (e.g., 4.5 minutes).

Thus, a temperature sensor (IoT cloud enabled sensor) may be located a known distance away from the fluid transfer pump, which is continually sampling i.e. "listening" (continually running detection operations) for the injection signal to be propagated. Once detected (at a level of statistical certainty or at a defined level), the velocity of the fluid movement and subsequent flow rate in the fluid transfer pump system may be determined and/or calculated. It should be noted that the flow rate of liquid mediums and higher energy transfer rates in the fluid transfer pump system is more distinct and responsive than the air of the fan of the heater example, above, and is illustrated only by way of example where speed of the fluid may relate to air convection caused by a heater fan.

Figure 6:
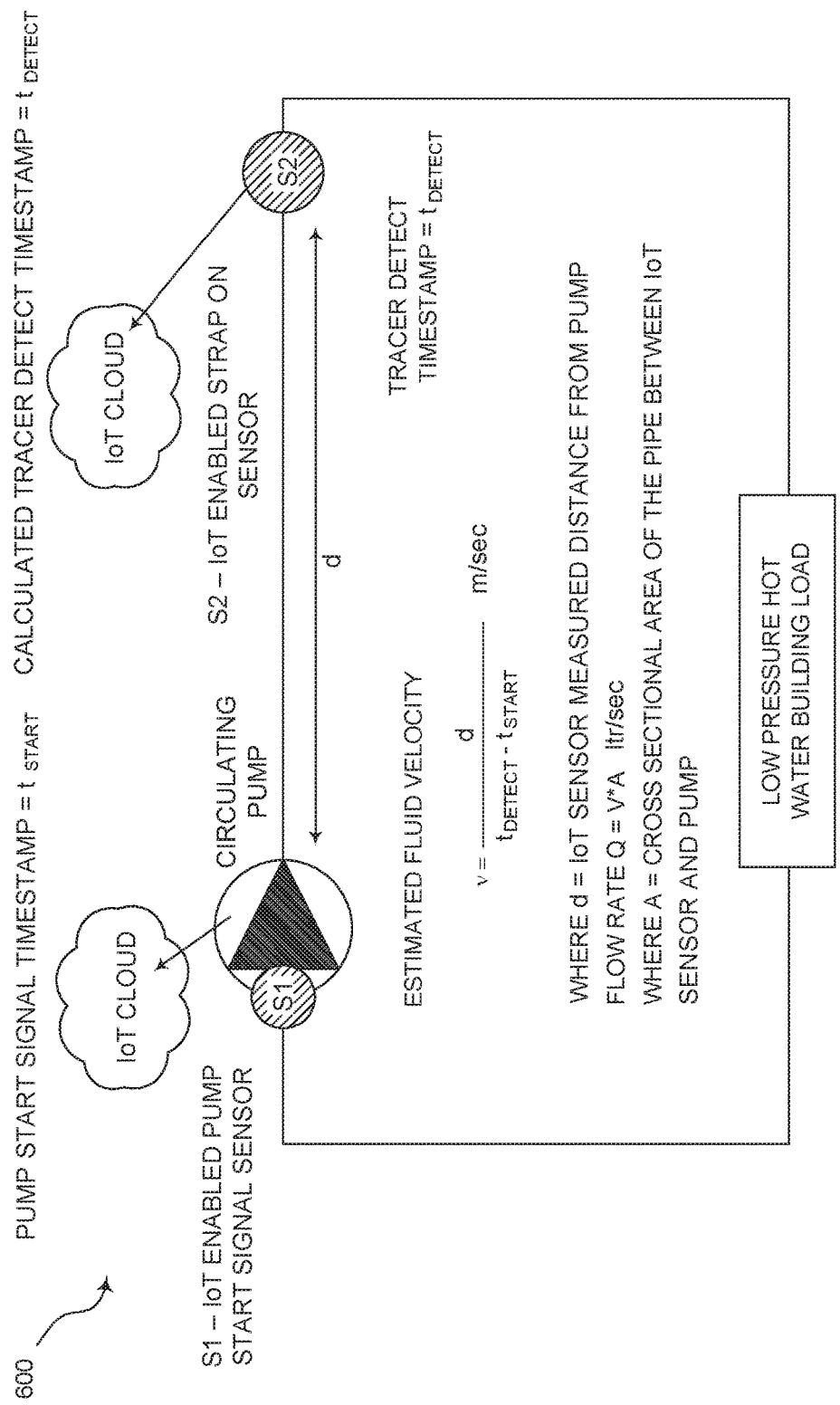
FIG. 6 is a block flow diagram of cognitive energy assessment in a fluid transfer pump system in an Internet of Things (IoT) computing network in accordance with aspects of the present invention.

FIG. 6 is a block flow diagram 600 of cognitive energy assessment in a fluid transfer pump system in an Internet of Things (IoT) computing network. As shown, the various functionality is depicted with arrows designating the flow diagram's 600 relationships with each other and to show process flow. Additionally, descriptive information is also seen relating to the functional flow diagram 600. As will be seen, many of the functional aspects may also be considered "modules", "components", or "devices" of functionality, in the same descriptive sense as has been previously described in FIGS. 1-4. With the foregoing in mind, various aspects of flow diagram 600 may be incorporated into various hardware and software components of a system for cognitively assessing energy in a fluid transfer pump system in a cloud computing environment with the present invention. Many of the functional aspects of flow diagram 600 may execute as background processes on various components, either in distributed computing components, or on the user device, or elsewhere, and generally unaware to the user performing generalized tasks for cognitively assessing energy in a fluid transfer pump system in a cloud computing environment.

The flow diagram 600 may include an IoT sensor ("S1") and an IoT sensor ("S2") connected to a load (e.g., a fluid transfer pump system such as, for example, a low pressure hot water (LPHW) system). The IoT sensor S2 (e.g., IoT enabled temperature sensor S2) may be coupled (e.g., strapped) to a pipe such as, for example, an outside portion of selected pipe section of a target pipe so as to measure the flow rate at a selected/measured distance (e.g., greater than 100 meters) from the IoT sensor S1. The IoT sensor S2 may be set at high frequency low delta logging mode to accurately detect the accuracy of arrival of the expected temperature injection signal tracer marked by the timestamp ($t_{detect}$). A predefined adjustable tracer input signal may be implemented at a timestamp ($t_{start}$) that may be monitored through an additional IoT sensor-based device such as, for example, IoT sensor S1 measuring an appropriate injection start signal (e.g., building management system ("BMS") "enable" signal), a peak current from an energy meter, or a VSD frequency so as to accurately capture the timestamp of the injection tracer input signal ($t_{start}$). That is the pump start signal timestamp may be equal to ($t_{start}$) and a determined/calculated tracer detect timestamp may be equal to ($t_{detect}$).

The various temperature readings from the IoT sensor S2 may be dynamically communicated to an IoT communication network (e.g., IoT cloud) so as to apply appropriate temperature signal detection operations running in an analytics layer of an IoT computing system so that an accurate temperature injection signal tracer timestamp ($t_{detect}$) can be established. The accuracy of the sensing can be improved over time as additional detection events are created and detection operations are fine-tuned and/or learned using a machine learning mechanism. From applying one or more determination/calculation operations to these two timestamps (e.g., timestamp ($t_{start}$) and timestamp ($t_{detect}$)) along with the distance measurement taken between the IoT sensor S1 and the IoT sensor S2, an estimate of heating system flow rate may be provided such as, for example, to an interactive graphical user interface ("GUI") of an internet-based computing system.

In one aspect, the estimated fluid velocity may be determined according to equation 1:

$$v = \frac{d}{t_{detect} - t_{start}} \text{ m/sec}, \qquad (1)$$

where v is the velocity (V) measured in meters (m) per second (sec) and d is equal to a distance of an IoT sensor measured from a pump. The flow rate ("Q") may be determined according to equation 2:

$$Q = v*A \text{ ltr/sec} \qquad (2),$$

where A is equal to a cross sectional area of a pipe between an IoT sensor and a pump.

Turning now to FIG. 7, a graph diagram 700 depicts output results of an energy detection operation upon injecting a tracer stimuli in a fluid transfer pump system. More specifically, graph diagram 700 depicts a detection operation of an event where an injection signal tracer is a cold system runup event. Graph diagram 700 depicts temperature signal first order derivative distribution for a boiler start event detection operation for a selected time period (e.g., a day). The event detection may be determined according to the equation:

$$E(t_n) = \frac{\partial T}{\partial t_n} > UCL, \qquad (3)$$

where T is equal to the difference in consecutive $T_{return}$ values, n is the sampling interval number, with the interval being a function of the sampling rate (the sampling rate of the logger), E is the slope and/or rate of change of temperature in an interval, UCL is equal to $\mu+3\sigma$ and $\mu$ may be the mean of the normal distribution of the first order temperature derivatives during normal system pumping operation (established over a training period) (e.g., a mean of a first derivative normal/standard boiler signal drift distribution over the training period), and $\sigma$ is equal to a first derivative normal boiler signal drift distribution variation during normal system pumping operation (acquired over a training period).

In one aspect, the detection operation may continuously look for and/or identify high derivatives which may be above a defined upper control limit or threshold over a selected period of time (e.g., 4 consecutive time periods) signaling a "runup" event. In this way, the present invention may determine the timestamp ($t_{detect}$). The temperature injection signal tracer (e.g., a tracer signal boiler runup event detection) may be determined according to the equation:

$$E(t_{detect}), E(t_{detect+1}), E(t_{detect+2}), E(t_{detect+3}) > UCL \qquad (4),$$

and the flow rate may be estimated from a previous logged pump start event timestamp (e.g., timestamp ($t_{start}$)) according to the equation (1) and (2).

Figure 8:
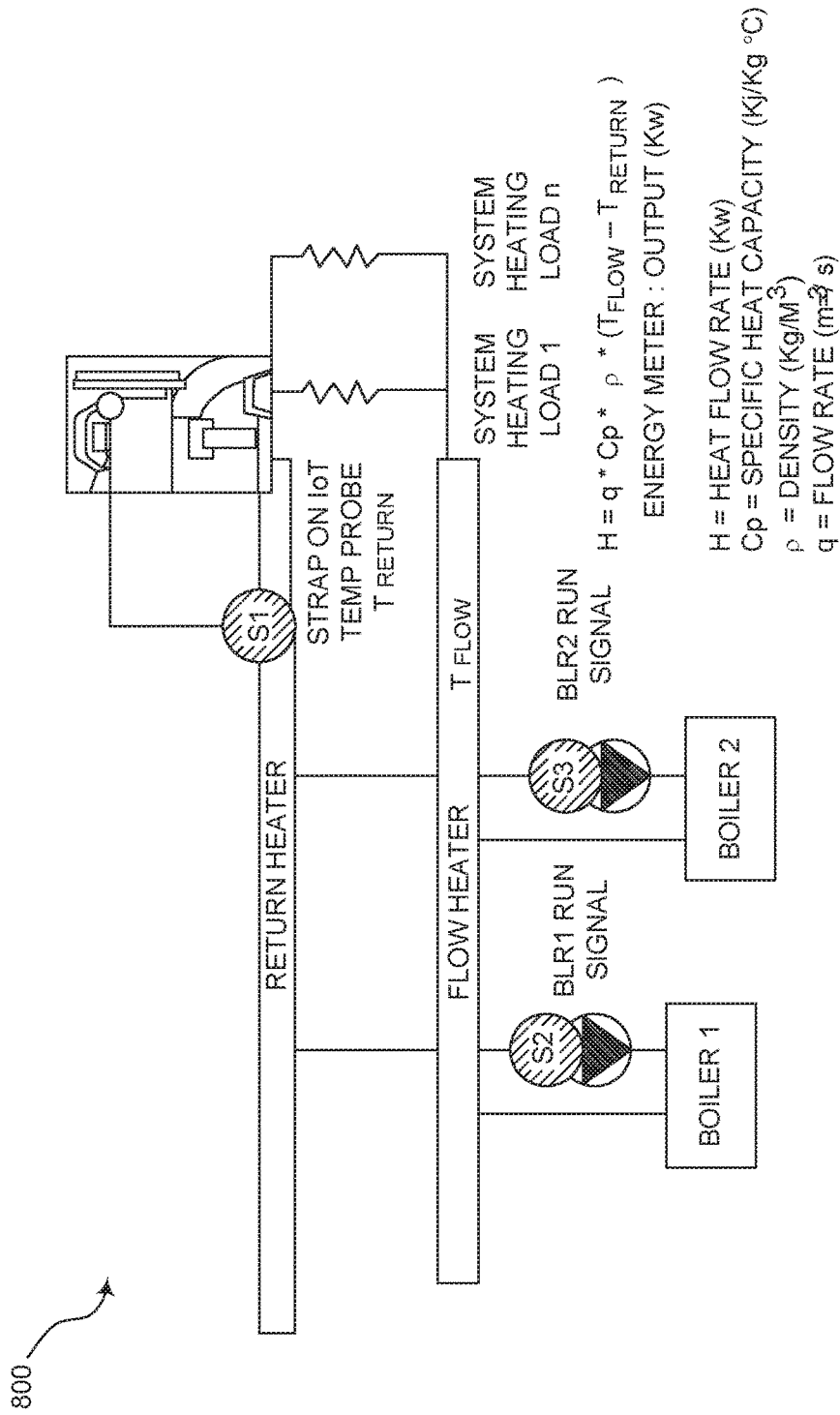
FIG. 8 is a diagram depicting various user hardware and computing components functioning in accordance with aspects of the present invention.

FIG. 8 is a diagram 800 depicting various user hardware and computing components functioning in a low pressure hot water (LPHW) system in accordance with aspects of the present invention. The LPHW system may include one or more boilers such as, for example, "boiler 1" and "boiler 2", one or more non-intrusive IoT sensors such as, for example, IoT sensor S1, IoT sensor S2 and IoT sensor S3, a flow heater, a return heater, a pump, and a heating system load (e.g., load 1 and load n).

The IoT sensor S1 (e.g., IoT enabled temperature sensor S1) may be coupled (e.g., strapped) to a pipe such as, for example, an outside portion of selected pipe section of a target pipe to enable a cognitive estimation of performance (e.g., fluid rate). The various high frequency (e.g., a frequency above a selected or defined frequency) temperature readings from the IoT sensor S1 may be communicated to an IoT communication network (e.g., IoT cloud) so as to apply appropriate temperature signal detection operations running on a single data point ($T_{return}$) and determine one or more key performance indicators ("KPI") such as, for example, system set point settings, a number of burner/boiler start events, or identification of system demand events, which may include no load demand events and/or short cycling demand events. Also, using the assistance of a machine learning model, an anomaly detection operation may be applied to determine (e.g., in real-time/on demand) one or more anomalous events.

In an additional aspect, an IoT temperature enabled sensor S1 (e.g., IoT enabled temperature sensor S1) may be coupled (e.g., strapped) to a pipe such as, for example, an outside portion of selected pipe section of a fluid-return line/pipe back to a pump to enable sampling of data, $T_{return}$, with the system running a no load operation. The present invention may cognitively determine the fluid flow rate ("q" or "Q") according to a tracer stimulus, injected into the fluid transfer pump system, by an IoT temperature enabled sensor S1, having a measured distance "d" (e.g., at least 50 meters) from a system pump head, so as to estimate an energy usage performance of the fluid transfer pump system. Upon determining the flow rate fluid flow rate ("q" or "Q"), a load event may be introduced into the system (e.g., an air handling start up event with a 100% heating request) so as to impact the data, $T_{return}$. The subsequent energy load as measured by an energy meter may be determined according to equation 5:

$$H = Q \times C_p \times \rho \times (T_{flow} - T_{return}) \qquad (5),$$

where H is the heat flow rate (e.g., kilowatt Kw), $C_p$ is the specific heat capacity (e.g., measured in kilojoules per kilogram (KJ/KG degrees Celsius), $\rho$ is the density (kg/m³ where kg is kilogram and m is meter), and Q is the flow rate (m³/s where s is seconds). Thus, for example, the flow rate ("Q") may be determined to be 0.0027 m³/s, the T may be measured at 72 degrees Celsius from the no load IoT temperature enabled sensor S1, and the $T_{return}$ may be measured at 68 degrees Celsius at the energy metering reference point timestamp (TS), where H=4185.5×0.027(72−68) and the energy meter demand (timestamp reference) may be equal to 450 kilowatts (kw).

Figure 9:
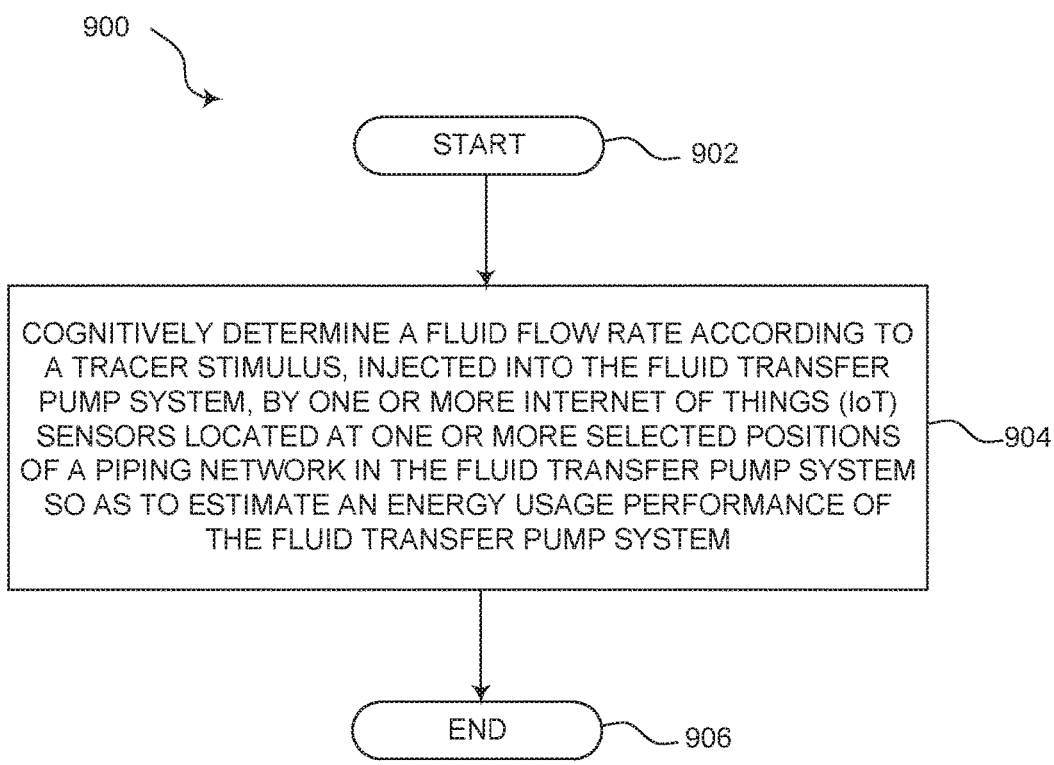
FIG. 9 is a flowchart diagram of an exemplary method for cognitively assessing energy in a fluid transfer pump system in a cloud computing environment by a processor, in which various aspects of the present invention may be realized.

FIG. 9 is a method 900 assessing energy in a fluid transfer pump system by a processor, in which various aspects of the illustrated embodiments may be implemented. The functionality 900 may be implemented as a method executed as instructions on a machine, where the instructions are included on at least one computer readable medium or one non-transitory machine-readable storage medium. The functionality 900 may start in block 902. A fluid flow rate may be cognitively determined according to a tracer stimulus, injected into the fluid transfer pump system, by one or more Internet of Things (IoT) sensors (e.g., one or more non-intrusive IoT sensors that do not require any intrusion into the fluid transfer pump system or located on an outside surface portion of a pipe of the fluid transfer pump system) located at one or more selected positions of a piping network in the fluid transfer pump system, as in block 904. The functionality 900 may end in block 906.

In one aspect, in conjunction with and/or as part of at least one block of FIG. 9, the operations of method 900 may include each of the following. The operations of method 900 may include detecting the tracer stimulus, injected into the fluid transfer pump system at a selected location and at a selected time period, by one or more IoT sensors located on one or more pipes of a fluid return section of the piping network in the fluid transfer pump system. The one or more IoT sensors may be in an IoT computing network.

The operations of method 900 may include cognitively estimating the fluid flow rate according to the detected tracer stimulus based on a first timestamp and a second timestamp. A series of rules and parameters may be implemented for injecting the tracer stimulus into the fluid transfer pump system and setting one or more parameters of the IoT sensors, wherein the IoT sensors are non-intrusive in the fluid transfer pump system and the tracer stimulus is an adjustable tracer stimuli. Feedback information may be collected from the IoT sensors to establish a health state of the fluid transfer pump system and detect one or more anomalous fluid transfer pump system events. A machine learning mechanism may be implemented using the feedback information to provide a cognitive estimate of an energy output of the fluid transfer pump system.

The operations of method 900 may include defining one or more settings of one or more non-intrusive IoT sensors to enable the one or more non-intrusive IoT sensors to detect a temperature injection tracer stimuli, wherein the one or more non-intrusive IoT sensors are coupled to the fluid transfer pump system at one or more defined distances from an alternative non-intrusive sensor, detecting the temperature injection tracer stimuli by one or more non-intrusive IoT sensors, wherein the alternative non-intrusive sensor measures a start time of the temperature injection tracer stimuli and the one or more non-intrusive IoT sensors detects an arrival time of the temperature injection tracer stimuli, cognitively determining the fluid flow rate and estimating an energy output of the fluid transfer pump system based on the detected temperature injection tracer stimuli, providing the energy output or fluid flow rate to a user via an interactive graphical user interface (GUI) according to the cognitive estimate of an energy output of the fluid transfer pump system, or a combination thereof.

One or more energy usage standards may be defined in the knowledge domain for testing and validating the energy usage anomalies in the fluid transfer pump system. A root cause analysis may be performed for each one of the tested and validated energy usage anomalies. A machine learning mechanism may be initialized using feedback information to learn behavior of the fluid transfer pump system, the energy usage profile, and behavior patterns of the fluid transfer pump system according to the injected tracer signal. The fluid transfer pump system may be in an Internet of Things (IoT) computing network.

In summary, by determining a fluid flow rate according to a tracer stimulus, injected into the fluid transfer pump system, by one or more Internet of Things (IoT) sensors located at one or more selected positions of a piping network in the fluid transfer pump system so as to estimate an energy usage performance of the fluid transfer pump system, the present invention provides a benefit and improvement by accurately assessing energy in a fluid transfer pump system. Thus, the accuracy in determining velocity of a fluid flowing is increased by using one or more non-intrusive IoT sensors located at one or more selected positions of a piping network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for assessing fluid flow rate in a fluid transfer pump system in a cloud computing environment by a processor, comprising:
   cognitively determining a fluid flow rate according to a tracer stimulus, injected into the fluid transfer pump system, by one or more non-intrusive Internet of Things (IoT) sensors located at one or more selected positions of a piping network in the fluid transfer pump system; and
   initializing a machine learning mechanism using the feedback information from the one or more non-intrusive IoT sensors to provide a cognitive estimate of an energy output of the fluid transfer pump system.

2. The method of claim 1, further including detecting the tracer stimulus, injected into the fluid transfer pump system at a selected location and at a selected time period, by the one or more non-intrusive IoT sensors located on one or more pipes of a fluid return section of the piping network in the fluid transfer pump system, wherein the one or more non-intrusive IoT sensors are in an IoT computing network.

3. The method of claim 1, further including cognitively estimating the fluid flow rate according to the detected tracer stimulus based on a first timestamp and a second timestamp.

4. The method of claim 1, further including implementing a series of rules and parameters for injecting the tracer stimulus into the fluid transfer pump system and setting one or more parameters of the one or more non-intrusive IoT sensors, wherein the tracer stimulus is an adjustable tracer stimuli.

5. The method of claim 1, further including determining a health state of the fluid transfer pump system using the one or more non-intrusive IoT sensors.

6. The method of claim 1, further including:
   defining one or more settings of the one or more non-intrusive IoT sensors to enable the one or more non-intrusive IoT sensors to detect a temperature injection tracer stimuli, wherein the one or more non-intrusive IoT sensors are coupled to the fluid transfer pump system at one or more defined distances from an alternative non-intrusive sensor;
   detecting the temperature injection tracer stimuli by the one or more non-intrusive IoT sensors, wherein the alternative non-intrusive sensor measures a start time of the temperature injection tracer stimuli and the one or more non-intrusive IoT sensors detects an arrival time of the temperature injection tracer stimuli;
   cognitively determining the fluid flow rate and estimating an energy output of the fluid transfer pump system based on the detected temperature injection tracer stimuli; and
   providing the energy output or fluid flow rate to a user via an interactive graphical user interface (GUI).

7. The method of claim 1, further including using a single data point sampled over a selected time period by the one or more non-intrusive IoT sensors in the fluid transfer pump system associated with a heating service, a cooling service, or a combination thereof.

8. A system for assessing fluid flow rate in a fluid transfer pump system in a cloud computing environment, comprising:
   one or more computers with executable instructions that when executed cause the system to:
      cognitively determine a fluid flow rate according to a tracer stimulus, injected into the fluid transfer pump system, by one or more non-intrusive Internet of Things (IoT) sensors located at one or more selected positions of a piping network in the fluid transfer pump system; and
      initialize a machine learning mechanism using the feedback information from the one or more non-intrusive IoT sensors to provide a cognitive estimate of an energy output of the fluid transfer pump system.

9. The system of claim 8, wherein the executable instructions further detect the tracer stimulus, injected into the fluid transfer pump system at a selected location and at a selected time period, by the one or more non-intrusive IoT sensors located on one or more pipes of a fluid return section of the piping network in the fluid transfer pump system.

10. The system of claim 8, wherein the executable instructions further cognitively estimate the fluid flow rate according to the detected tracer stimulus based on a first timestamp and a second timestamp.

11. The system of claim 8, wherein the executable instructions further implement a series of rules and parameters for injecting the tracer stimulus into the fluid transfer pump system and setting one or more parameters of the one or more non-intrusive IoT sensors, wherein the tracer stimulus is an adjustable tracer stimuli.

12. The system of claim 8, wherein the executable instructions further determine a health state of the fluid transfer pump system using the one or more non-intrusive IoT sensors.

13. The system of claim 8, wherein the executable instructions further:
   define one or more settings of the one or more non-intrusive IoT sensors to enable the one or more non-intrusive IoT sensors to detect a temperature injection tracer stimuli, wherein the one or more non-intrusive IoT sensors are coupled to the fluid transfer pump system at one or more defined distances from an alternative non-intrusive sensor;

detect the temperature injection tracer stimuli by the one or more non-intrusive IoT sensors, wherein the alternative non-intrusive sensor measures a start time of the temperature injection tracer stimuli and the one or more non-intrusive IoT sensors detects an arrival time of the temperature injection tracer stimuli;

cognitively determine the fluid flow rate and estimate an energy output of the fluid transfer pump system based on the detected temperature injection tracer stimuli; and provide the energy output or fluid flow rate to a user via an interactive graphical user interface (GUI).

14. The system of claim 8, wherein the executable instructions further use a single data point sampled over a selected time period by the one or more non-intrusive IoT sensors in the fluid transfer pump system associated with a heating service, a cooling service, or a combination thereof.

15. A computer program product for assessing fluid flow rate in a fluid transfer pump system in a cloud computing environment by a processor, the computer program product comprising a non-transitory computer-readable storage medium having computer-readable program code portions stored therein, the computer-readable program code portions comprising:

an executable portion that cognitively determines a fluid flow rate according to a tracer stimulus, injected into the fluid transfer pump system, by one or more non-intrusive Internet of Things (IoT) sensors located at one or more selected positions of a piping network in the fluid transfer pump system; and an executable portion that initializes a machine learning mechanism using the feedback information from the one or more non-intrusive IoT sensors to provide a cognitive estimate of an energy output of the fluid transfer pump system.

16. The computer program product of claim 15, further including an executable portion that detects the tracer stimulus, injected into the fluid transfer pump system at a selected location and at a selected time period, by the one or more non-intrusive IoT sensors located on one or more pipes of a fluid return section of the piping network in the fluid transfer pump system.

17. The computer program product of claim 15, further including an executable portion that cognitively estimates the fluid flow rate according to the detected tracer stimulus based on a first timestamp and a second timestamp.

18. The computer program product of claim 15, further including an executable portion that implements a series of rules and parameters for injecting the tracer stimulus into the fluid transfer pump system and setting one or more parameters of the one or more non-intrusive IoT sensors, wherein the one or more non-intrusive IoT sensors are non-intrusive in the fluid transfer pump system and the tracer stimulus is an adjustable tracer stimuli.

19. The computer program product of claim 15, further including an executable portion that:

determines a health state of the fluid transfer pump system using the one or more non-intrusive IoT sensors.

20. The computer program product of claim 15, further including an executable portion that:

defines one or more settings of the one or more non-intrusive IoT sensors to enable the one or more non-intrusive IoT sensors to detect a temperature injection tracer stimuli, wherein the one or more non-intrusive IoT sensors are coupled to the fluid transfer pump system at one or more defined distances from an alternative non-intrusive sensor;

detects the temperature injection tracer stimuli by the one or more non-intrusive IoT sensors, wherein the alternative non-intrusive sensor measures a start time of the temperature injection tracer stimuli and the one or more non-intrusive IoT sensors detects an arrival time of the temperature injection tracer stimuli;

cognitively determines the fluid flow rate and estimates an energy output of the fluid transfer pump system based on the detected temperature injection tracer stimuli; and provides the energy output or fluid flow rate to a user via an interactive graphical user interface (GUI), wherein the one or more non-intrusive IoT sensors are in an IoT computing network.

21. The computer program product of claim 15, further including an executable portion that uses a single data point sampled over a selected time period by the one or more non-intrusive IoT sensors in the fluid transfer pump system associated with a heating service, a cooling service, or a combination thereof.

* * * * *